US 7,472,388 B2

(12) United States Patent
Fukunari et al.

(10) Patent No.: US 7,472,388 B2
(45) Date of Patent: Dec. 30, 2008

(54) JOB MONITORING SYSTEM FOR BROWSING A MONITORED STATUS OVERLAPS WITH AN ITEM OF A PRE-SET BROWSING END DATE AND TIME (75) Inventors: Chiho Fukunari, Yokohama (JP); Norikazu Nishibe, Yokohama (JP); Katsunori Yoshii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 888 days.

(21) Appl. No.: 10/802,910

(22) Filed: Mar. 18, 2004

(65) Prior Publication Data
US 2004/0250249 A1 Dec. 9, 2004

(30) Foreign Application Priority Data
Jun. 3, 2003 (JP) ............................. 2003-158164

(51) Int. Cl.
G06F 9/46 (2006.01)
G05B 11/01 (2006.01)
G05B 15/00 (2006.01)
(52) U.S. Cl. ............................ 718/100; 700/17; 700/83
(58) Field of Classification Search ................ 715/744, 715/772, 963; 718/100; 700/15, 17, 80, 700/83; 709/203
See application file for complete search history.

(56) References Cited
U.S. PATENT DOCUMENTS

| 5,790,974 | A * | 8/1998 | Tognazzini | 455/456.5 |
|---|---|---|---|---|
| 6,463,352 | B1 * | 10/2002 | Tadokoro et al. | 700/169 |
| 6,477,374 | B1 * | 11/2002 | Shaffer et al. | 455/445 |
| 6,792,460 | B2 * | 9/2004 | Oulu et al. | 709/224 |
| 2002/0032839 | A1 * | 3/2002 | Yamamoto et al. | 711/118 |
| 2003/0233387 | A1 * | 12/2003 | Watanabe et al. | 709/100 |

FOREIGN PATENT DOCUMENTS
JP 09-062542 3/1997

* cited by examiner

Primary Examiner—Meng-Ai An
Assistant Examiner—Camquy Truong
(74) Attorney, Agent, or Firm—Antonelli, Terry, Stout & Kraus, LLP.

(57) ABSTRACT

A job status monitoring method of monitoring statuses of jobs executed on a computer includes the steps of acquiring job schedule information and setting an item of execution monitoring start date and time of the job and an item of execution monitoring end date and time of the job, selecting, when a browsing time zone represented by an item of browsing start date and time of a monitored status and an item of browsing end date and time of a monitored status overlaps with a monitoring time zone represented by the execution monitoring start date and time and the execution monitoring end date and time, a job to which the execution monitoring start date and time and the execution monitoring end date and time are specified and setting the job as a monitoring item, and creating a monitor screen data to display a monitored status of the selected job.

10 Claims, 11 Drawing Sheets

20 SCHEDULE TABLE

| JOB NAME | DATE/TIME TYPE | EXECUTION START SCHEDULE DATE AND TIME | | | EXECUTION PLACE | | | RELATED ITEM | |
|---|---|---|---|---|---|---|---|---|---|
| | | DATE | DAY OF WEEK | TIME | COUNTRY | AREA OF SAME INTERNATIONAL DATE | | | |
| JOB 1 | ABSOLUTE DAY | 2003/04/24 | FRI | 10:00 | JAPAN | TOKYO | | HOST 1 | ... |
| JOB 2 | TIME | 2003/04/24 | FRI | 23:00 | JAPAN | OSAKA | | HOST 2 | ... |
| JOB C | DAY OF WEEK | 2003/04/25 | SAT | 1:00 | JAPAN | HOKKAIDO | | HOST 3 | ... |
| ...... | ...... | ...... | ...... | ...... | ...... | ...... | | ...... | ... |

FIG. 3

30 EXECUTION RESULT VALUE TABLE

| JOB NAME | EXECUTION RESULT TIME | EXECUTION RESULT | EXECUTION START DATE AND TIME | | | EXECUTION END DATE AND TIME | | | |
|---|---|---|---|---|---|---|---|---|---|
| | | | DATE | DAY OF WEEK | TIME | DATE | DAY OF WEEK | TIME | |
| JOB 1 | 2.00.00 | NORMAL TERMINATION | 2003/04/24 | FRI | 10:05 | 2003/04/24 | FRI | 12:05 | ... |
| JOB 2 | 5.00.00 | NORMAL TERMINATION | 2003/04/24 | FRI | 23:15 | 2003/04/25 | SAT | 4:15 | ... |
| JOB 3 | 1.00.00 | NORMAL TERMINATION | 2003/04/25 | SAT | 1:01 | 2003/04/25 | SAT | 2:01 | ... |
| ...... | ...... | ...... | ...... | ...... | ...... | ...... | ...... | ...... | ... |

FIG. 4

40 MONITORING ITEM TABLE

| MONITORING OBJECT | SPECIFIC MONITORING OBJECT | STATE | PLACE | | RATE OF OPERATION (%) | MONITORING DATE AND TIME | | |
|---|---|---|---|---|---|---|---|---|
| | | | COUNTRY | AREA OF SAME INTERNATIONAL DATE | | START | END | |
| 41 | 42 | 43 | 44 | | 45 | 46 | | |
| HOST 1 | CPU 1 | NORMAL | JAPAN | TOKYO | 15 | 2003/04/01 1:30 | | ... |
| HOST 1 | CPU 2 | ABNORMAL | JAPAN | TOKYO | 90 | 2003/04/01 1:01 | 2003/04/21 9:21 | ... |
| HOST 1 | CPU 3 | WARNING | JAPAN | TOKYO | 70 | 2003/04/21 9:22 | | ... |
| ...... | ...... | ...... | ...... | ...... | ...... | ...... | ...... | ... |

FIG. 5

50 ADJUSTING TABLE BROWSE SCREEN DISPLAY TIME

| MANAGEMENT GROUP | MONITORING OBJECT | EXECUTION MONITORING START DATE AND TIME | | | EXECUTION MONITORING END DATE AND TIME | | | MONITORED STATUS |
|---|---|---|---|---|---|---|---|---|
| | | DATE | DAY OF WEEK | TIME | DATE | DAY OF WEEK | TIME | |
| 51 | 52 | 53 | | | 54 | | | 55 |
| WORK 1 | JOB 1 | 2003/04/24 | FRI | 10:00 | 2003/04/24 | FRI | 13:00 | NORMAL |
| WORK 2 | JOB 2 | 2003/04/24 | FRI | 23:00 | 2003/04/25 | SAT | 3:50 | ABNORMAL |
| WORK 5 | JOB 3 | 2003/04/25 | SAT | 1:00 | 2003/04/25 | SAT | 3:00 | NORMAL |
| ...... | ...... | ...... | ...... | ...... | ...... | ...... | ...... | ...... |

FIG. 8

80 DATA SAVING TABLE

| MANAGEMENT GROUP (81) | MONITORING OBJECT (82) | DATE/TIME TYPE (83) | EXECUTION START SCHEDULE TIME (84) | | | RELATED MONITORING ITEM (85) | OPERATION INDEX (86) | EXECUTION TIME OPTIMAL VALUE (87) | |
|---|---|---|---|---|---|---|---|---|---|
| | | | DATE | DAY OF WEEK | TIME | | | | |
| WORK 1 | JOB 1 | YEAR | 2003/04/24 | FRI | 10:00 | PROCESS 1 | 0 | 2.00 | ... |
| | | | | | | PROCESS 2 | | | ... |
| | | | | | | PROCESS 3 | | | |
| WORK 2 | JOB 2 | HOUR | | | 23:00 | MEMORY 1 | 2 | 4.50 | ... |
| | | | | | | PROCESS 4 | 0 | 3.00 | ... |
| | | | | | | CPU4 | 1 | 3.50 | |
| WORK 3 | JOB 3 | WEEK | | SAT | 1:00 | MEMORY 2 | 4 | 0.50 | ... |
| | | | | | | CPU3 | | | ... |
| | | | | | | CPU2 | | | |
| ... | ... | ... | ... | ... | ... | ... | ... | ... | ... |

JOB MONITORING SYSTEM FOR BROWSING A MONITORED STATUS OVERLAPS WITH AN ITEM OF A PRE-SET BROWSING END DATE AND TIME

BACKGROUND OF THE INVENTION

The present invention relates to a job status monitoring system for monitoring operation or statuses of jobs executed on a computer, and in particular, to a technique effectively applied to a job status monitoring system for monitoring statuses of jobs by efficiently displaying monitoring items and information items of failure on a job status monitoring screen.

In a conventional job status monitoring system running on a computer, information items indicating statuses of scheduled jobs to be executed later and a status of a current job currently in execution are collected and are displayed on a monitoring screen in a first display method. When the current job in execution abnormally terminates due to, for example, occurrence of an error, the current job in execution and scheduled jobs which possibly are affected by the current job are displayed in a second display method other than the first display method to thereby explicitly notify the occurrence of abnormality to the operator monitoring the job statuses.

For example, there has been well known a network monitoring method in which, for example, at change of a monitoring status of an object or item being displayed using a first mark, a preceding status is displayed using a second mark other than the first mark and a current status is displayed using the first mark. This operation is repeatedly conducted at a predetermined interval of time in a dynamic way so that the operator visually recognizes the status change. Reference is to be made to JP-A-9-62542.

In the prior art, statuses of jobs normally executed and those of jobs executed only once per year or month are also displayed on the monitor screen. Therefore, to monitor a complex job a large number of jobs, the statuses of the jobs displayed on the monitor screen lead to a problem of difficulty, that is, the monitoring operation of a large number of jobs cannot be efficiently conducted.

SUMMARY OF THE INVENTION

It is therefore an object of the present invention, which has been devised to solve the problem, to provide a technique capable of efficiently monitoring statuses of jobs executed on a computer and efficiently coping with failure in the jobs at a high speed.

According to the present invention, there is provided a job status monitoring system to monitor statuses of jobs executed on a computer in which jobs scheduled to be executed in a zone of time to browse job statuses are selected and the statuses of these jobs are displayed.

In the job status monitoring system according to the present invention, when schedule information including an execution start schedule date and time item to start execution of a job is changed (also addition or deletion of schedule information) or execution result value information including a execution result time indicating a period of time used to execute a job is changed (also addition or deletion of execution result value information), a job executing section generates an event indicating the change and notifies the event to a integrated monitoring section.

The integrated monitoring section receives the event and obtains the schedule information indicating a job execution schedule and then sets an execution monitoring start date and time item to start monitoring the job and an execution monitoring end date and time item to finish monitoring the job using the execution start schedule date and time of the job and the execution result time of the job.

In the operation, it is also possible to set a predetermined period of time according to information which possibly influences execution of the job, for example, an rate of operation of the computer executing the job or the number of abnormal terminations. The period of time is additionally set immediately before and after a time zone from the execution start schedule date and time of the job to a point of time determined by adding a period of job execution time to the execution start schedule date and time. This resultantly sets the execution monitoring start schedule date and time and the execution monitoring end schedule date and time.

It is also possible to obtain a mean value from the execution result time values obtained as results of execution of the job. The mean value is then set as an execution time optimal value. Or, it is also possible to calculate, according to a relationship between the execution result time and the rate of operation at execution of the job, an execution time optimal value required to execute the job at the rate of operation. Finally, the execution monitoring start schedule date and time and the execution monitoring end schedule date and time are set using the execution time optimal value.

Next, the integrated monitor screen browsing section receives a browsing start date and time item indicating the date and time to start browsing the statuses monitored as above and a browsing end date and time item indicating the date and time to end browsing the statuses. The browsing section then sends to the integrated monitoring section the browsing start date and time item and the browsing end date and time item as well as information of a browsing place to browse the statuses, i.e., information indicating a place at which the integrated monitor screen browsing section is installed.

The integrated monitoring section receives the information sent from the integrated monitor screen browsing section and compares a browsing time zone indicated by the browsing start date and time and the browsing end date and time with a monitoring time zone indicated by the execution monitoring start date and time and the execution monitoring end date and time. If these time zones overlap with each other, the integrated monitoring section selects as a browsing object or item a job to which the execution monitoring start date and time and the execution monitoring end date and time are set.

In this operation, the integrated monitoring section compares the browsing place to browse the monitored statuses with an execution place where the job is executed to determine whether or not any difference exists in time therebetween. If such a time difference is present, the integrated monitoring section corrects the information of the date and time and then selects a browsing object.

Thereafter, the integrated monitoring section generates monitor screen data to display a monitored status of the job selected as the browsing object and sends the data to the integrated monitor screen browsing section. When the data is received, the integrated monitor screen browsing section displays a monitor screen on a display using the monitor screen data.

As above, in the job status monitoring system according to the present invention, the manager to monitor statuses of jobs of applications for business sets a relatively short period of time such as one hour or one day as the browsing date and time. The system then extracts application jobs scheduled for execution during the browsing time zone thus set by the manager and generates monitor screen data to display only information regarding the extracted jobs and other items such as failure associated with the jobs. This restricts the number of jobs to be monitored by the manager. Therefore, the system can efficiently cope with failure at a high speed.

According to the job status monitoring system of the present invention described above, the system selects the jobs scheduled to be executed during the time zone to browse the monitored statuses and displays the monitored statuses of the jobs. Therefore, the system can efficiently monitor at a high speed the statuses of the jobs executed on a computer and can similarly cope with failure in the jobs at a high speed.

Other objects, features and advantages of the invention will become apparent from the following description of the embodiments of the invention taken in conjunction with the accompanying drawings.

DESCRIPTION OF THE EMBODIMENTS

Description will now be given of an embodiment of a job status monitoring system to monitor statuses of jobs executed on a computer.

Figure 1:
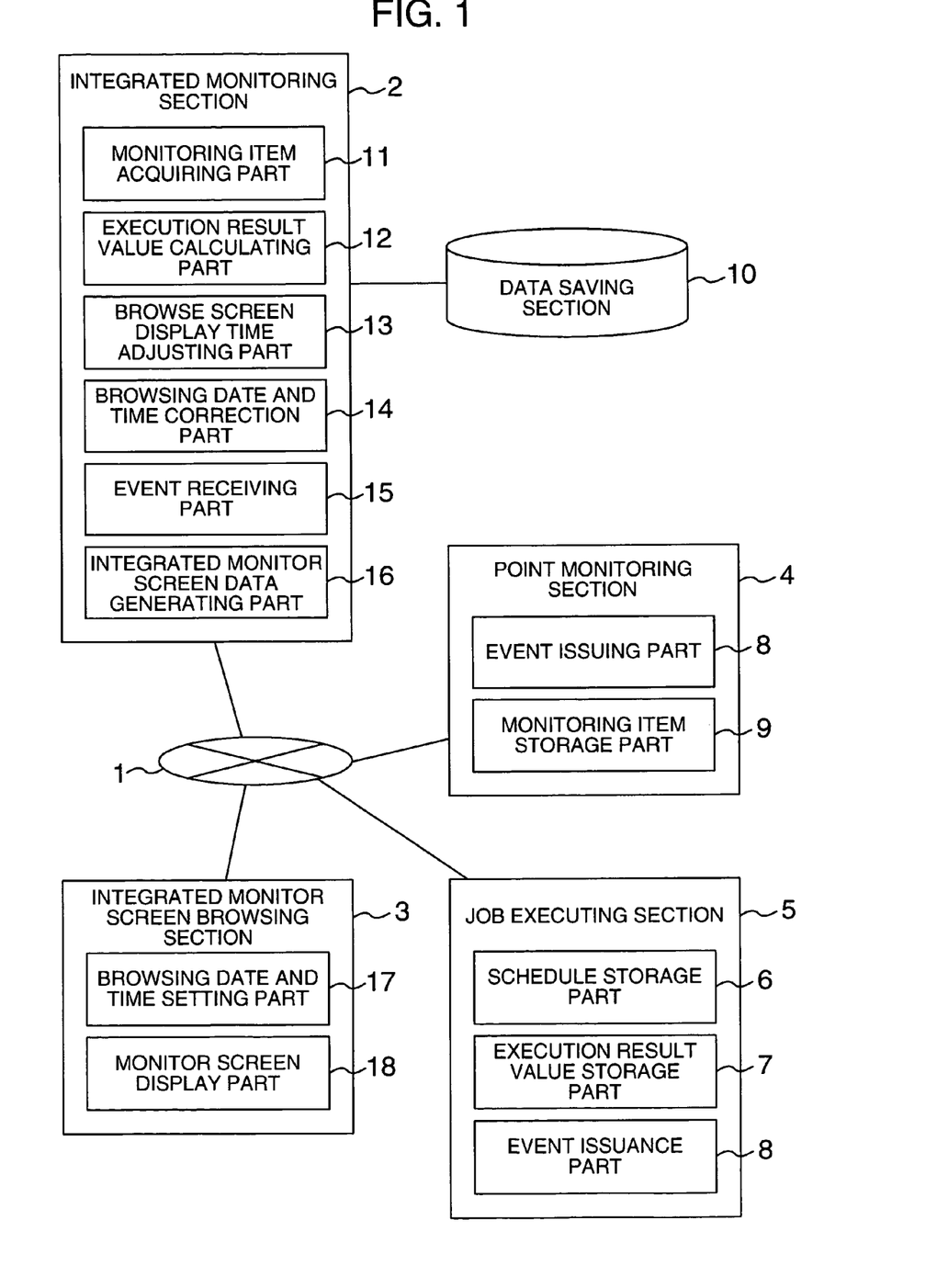
FIG. 1 is a block diagram showing an overall configuration of an embodiment of a job status monitoring system.

FIG. 1 shows an overall configuration of an embodiment of a job status monitoring system. As can be seen from FIG. 1, the embodiment includes a integrated monitoring section 2, a integrated monitor screen browsing section 3, a point monitoring section 4, a job executing section 5, a schedule storage part 6, an execution result value storage part 7, an event issuing part 8, a monitoring item storage part 9, a data saving section 10, a monitoring item acquiring part 11, an execution result value calculating part 12, a browse screen display time adjusting part 13, a browsing date and time correction part 14, an event receiving part 15, a integrated monitor screen data generating part 16, a browsing date and time setting part 17, and a monitor screen display part 18.

The integrated monitoring section 2 is a processing section to monitor statuses of jobs by combining information via a network 1 from at least one job executing section 5 with information from the point monitoring section 4. The integrated monitor screen browsing section 3 is a processing section to display a integrated monitor screen to monitor job statuses using integrated monitor screen data created by the integrated monitoring section 2.

The point monitoring section 4 is a processing section to monitor statuses of associated devices such as a central processing unit (CPU), a memory, a magnetic disk device, and a network which influence execution statuses of jobs. Using information of the job statuses, the section 4 obtains information regarding an rate of operation of the computer.

The job executing section 5 is a processing section to execute jobs according to a schedule such as a job to calculate a total amount of actual job hours and a total amount of travelling expenses, a salary calculation job, a backup job, and a software distribution job. The section 5 also monitors statuses of these jobs.

The schedule storage part 6 is a processing part to store an execution schedule of jobs for execution by the job executing section 5 in a schedule table 20 to control the job execution schedule. The execution result value storage part 7 is a processing part to store and control, in an execution result value table 30, items regarding jobs executed by the job executing section 5 such as a execution result time indicating a period of time used to execute a job, a termination state, an execution start date and time item, and an execution end date and time item.

The event issuance part 8 is a processing part to operate when any item is changed in the schedule table 20, the execution result value table 30, and a monitoring item table 40. The part 8 notifies the change as an event to the integrated monitoring section 2.

The monitoring item storage part 9 is a processing part to store states of the resources influencing the job execution statuses in the monitoring item table 40 to control the states of the resources.

The monitoring item acquiring part 11 acquires monitoring items such as schedule information indicating a job execution schedule, execution result values such as a execution result time used for job execution, and an rate of operation of a computer having executed a job from the job executing section 5 and the point monitoring section 4. The part 11 establishes a correspondence between the monitoring items according to indices such as a computer name beforehand assigned to the computer.

The execution result value calculating part 12 is a processing part to calculate, according to information such as the execution result time and the rate of operation obtained by the monitoring item acquiring part 11, a period of execution time to be used in the setting of the execution monitoring start date and time and the execution monitoring end date and time.

The browse screen display time adjusting part 13 is a processing section operated when a browsing time zone represented by the browse start date and time to start browsing the monitored statuses and the browse end date and time to finish browsing the monitored statuses overlaps with a monitoring time zone represented by the execution monitoring start date and time and the execution monitoring end date and time described as above. In this situation, the part 13 selects as a browsing object a job to which the execution monitoring start date and time and the execution monitoring end date and time are set.

The browsing date and time correction part 14 is a processing part to correct the information of the date and time items according to the difference in time between the browsing place to browse the monitored statuses and the execution place to execute jobs. The event receiving part 15 is a processing part to receive an event notified from the event issuance part 8. The part 15 notifies the change indicated by the event to another processing section or part and stores the change in the data saving section 10.

The integrated monitor screen data generating part 16 is a processing part to create monitor screen data to display the monitored statuses of the job selected as a browsing object by the browse screen display time adjusting part 13.

The browsing date and time setting part 17 is a processing part to receive specification items of the browsing start date and time and the browsing end date and time to send the browsing start date and time, the browsing end date and time, and information of the browsing place to browse monitored statuses to the integrated monitoring section 2.

The monitor screen display part 18 is a processing part to receive the monitor screen data created by the integrated monitor screen data generating part 16 to display a monitor screen to browse statuses of jobs.

It is assumed that programs to make the job status monitoring system serve as the integrated monitoring section 2, the integrated monitor screen browsing section 3, the point monitoring section 4, the job executing section 5, the schedule storage part 6, the execution result value storage part 7, the event issuing part 8, the monitoring item storage part 9, the monitoring item acquiring part 11, the execution result value calculating part 12, the browse screen display time adjusting part 13, the browsing date and time correction part 14, the event receiving part 15, the integrated monitor screen data generating part 16, the browsing date and time setting part 17, and the monitor screen display part 18 are recorded on a recording medium such as a compact disk (CD) read-only memory (ROM). The programs in the recording medium are then stored in a storage such as a magnetic disk and are finally loaded therefrom in a memory for execution thereof. It is also possible to use recording media other than the CD-ROM. The programs may also be installed in an information processing apparatus from the recording medium. Or, the user may access the recording medium via a network to use the programs.

Figure 2:
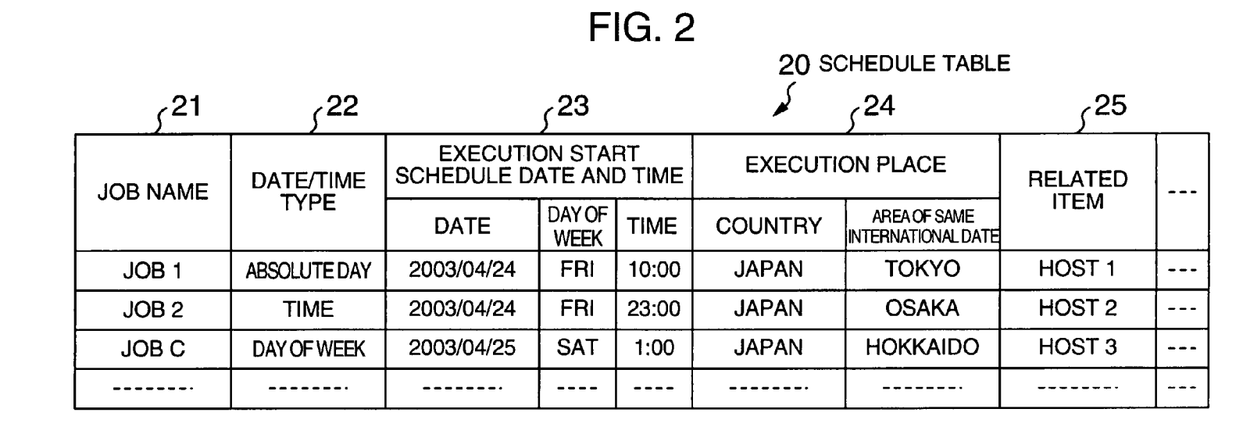
FIG. 2 is a diagram showing an example of data items in a schedule table of the embodiment.

FIG. 2 shows an example of data items in a schedule table of the embodiment. As shown in FIG. 2, the schedule table 20 under control of the schedule storage part 6 includes a job name 21 to store a name of a job to be executed, a date and time type 22 to store a schedule type to discriminate the application types such as a weekly application to be executed once a week, a daily application to be daily executed, and an application to be executed on a particular day specified in advance, an execution start schedule date and time item 23 to store a date and time item to start execution of the job, an execution place 24 to store a country and an area of the same international date for the execution of the job, and a related item 25 to establish a correspondence between the job and a monitoring object of the point monitoring section 4.

Figure 3:
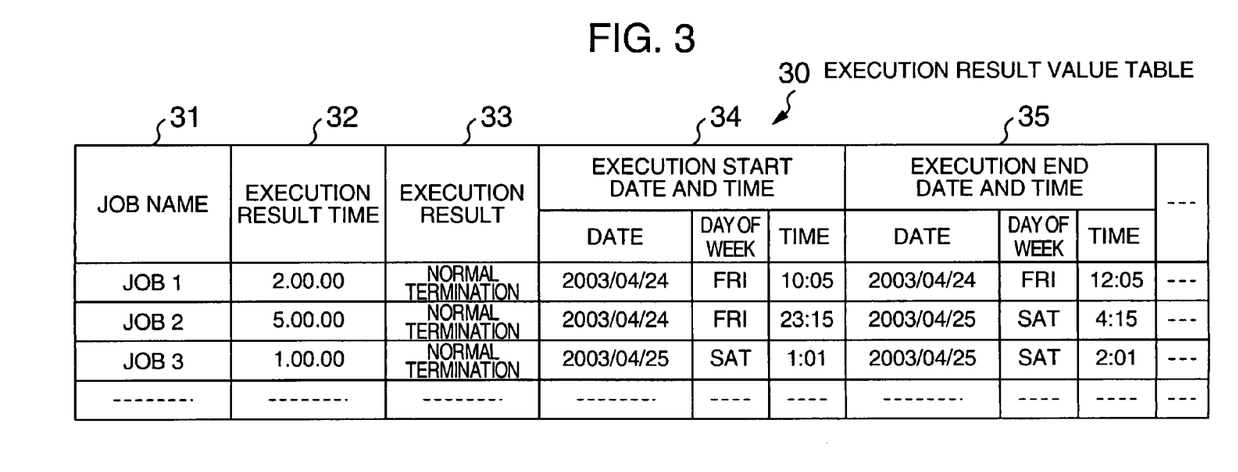
FIG. 3 is a diagram showing an example of data items in an execution result value table of the embodiment.

FIG. 3 shows an example of data items in an execution result value table of the embodiment. As can be seen from FIG. 3, the execution result value table 30 under control of the execution result storage part 7 includes a job name 31 to store a name of a job to be executed, a execution result time 32 to store a period of time used to execute the job, an execution result 33 to indicate a status at termination of the job, an execution start date and time item 34 to store a date and time item indicating a point of time at which the job execution is started, and an execution end date and time item 34 to store a date and time item indicating a point of time at which the job execution is finished.

Figure 4:
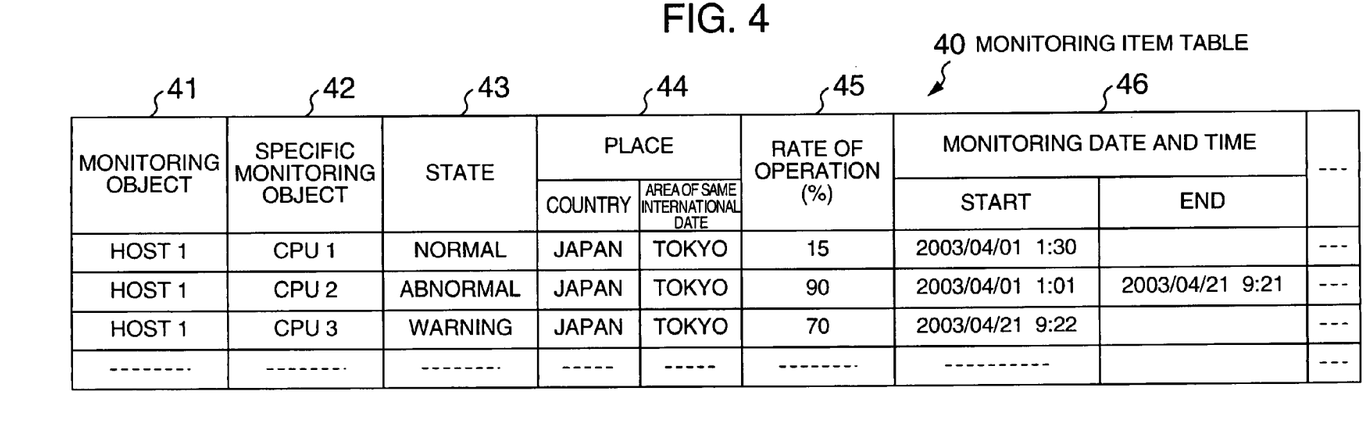
FIG. 4 is a diagram showing an example of data items in a monitoring item table of the embodiment.

FIG. 4 shows an example of data items in a monitoring item table of the embodiment. As shown in FIG. 4, the monitoring item table 40 under control of the monitoring item storage part 9 includes a monitoring item 41 indicating a name of a device as a monitoring object of the point monitoring section 4, a specific monitoring item 42 indicating a specific resource as a monitoring object of the point monitoring section 4, a state 43 indicating a monitored state of the resource, a place 44 indicating a country and an area of the same international date in which the resource is monitored, an rate of operation 45 of the resource, and a monitoring date and time item 46 indicating a period of time during which the resource operates at the rate of operation.

It is also possible to set a threshold value such that when a state associated with the threshold value occurs, an event is notified to the integrated monitoring section 2 according to the state of each resource. For example, in an operation to monitor a network device, when a traffic value of a network exceeds a threshold value specified in advance, the event issuance part 8 issues an event to the integrated monitoring section 2. Or, in an operation to monitor a storage, when a predetermined state takes place, for example, when a state represented by a combination of a storage type and data capacity thereof or a state indicating that a predetermined retry count is exceeded takes place, the event issuance part 8 issues an event to the integrated monitoring section 2.

The event issuance section 8 may use various notifying methods according to priority of each item. For example, the section 8 may send an event in a real-time operation or may send a batch of events in a batch processing manner. For example, when a job terminates abnormally in the job executing section 5 or when the state 43 being monitored in the point monitoring section 4 is changed, a high priority value of "1" is assumed and an event is transmitted in a real-time fashion. When the job execution schedule is changed, an intermediate priority of "2" is assumed. When the monitoring object name is changed, a lower priority of "3" is assumed. The manager can set the priority level in this way to reduce the load imposed on the network and the integrated monitoring section 2.

Figure 5:
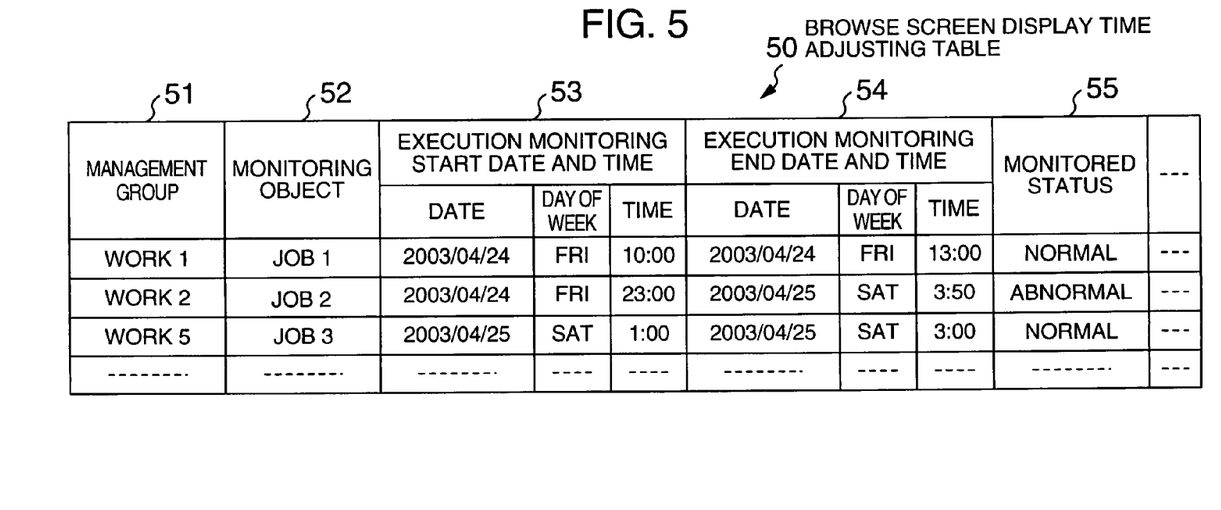
FIG. 5 is a diagram showing an example of data items in a browse screen display time adjusting table of the embodiment.

FIG. 5 shows an example of data items in a browse screen display time adjusting table of the embodiment. As shown in FIG. 5, the browse screen display time adjusting table 50 stored in the data storage section 10 includes a management group 51 indicating a name of a monitoring object used to collectively management a work, a monitoring object 52 indicating a job as a monitoring object, an execution monitoring start date and time item 53 indicating a date and time to start monitoring the job, an execution monitoring end date and time item 53 indicating a date and time to finish monitoring the job, and a monitored status 55 indicating a status of the job.

Next, description will be given of processing in the job status monitoring system to monitor statuses of jobs executed on a computer. In the processing, a job scheduled for execution during a browsing time zone to browse monitored statuses is selected and a monitored status of the job is displayed.

The job storage part 6 of the job executing section 5 stores an execution schedule of each job to be executed by the job executing section 5 in the schedule table 20 to control the execution schedule. When a schedule change request is received from the manager, the job storage part 6 updates the schedule table 20 according to items specified in the request.

The execution result value storage part 7 stores, when the job executing section 5 initiates a job, execution result values such as the execution result time 32 in the execution result value table 30 according to a status of execution of the job.

The event issuance part 8 of the job executing section 5 monitors update states of the schedule table 20 and the execution result value table 30. When a change occurs in the tables, the event issuance part 8 notifies an event of the table change to the integrated monitoring section 2.

The event receiving part 15 of the integrated monitoring section 2 receives the event sent from the event issuance part 8 and then notifies the table change indicated by the event to the monitoring item acquiring part 11.

The part 11 receives the table change notification, creates a record including the job name in the table change notification as a monitoring object 52, and adds the record to the browse screen display time adjusting table 50. In the operation, it is also possible to classify monitoring objects into groups. Specifically, it is possible to set a management group 51 to collectively treat a plurality of monitoring objects according to a predetermined rule.

For example, such groups can be set for respective servers using the host name specified in the related item 25 for each job. By assigning an index to any other item, the monitoring objects can be classified into groups. The operation to produce groups may be conducted at timing when the associated item is collected or immediately after the operation is started. Or, the control groups may also be formed in a hierarchic configuration.

Thanks to provision of the groups, when the monitor screen is browsed in tree structure, the collected display images are easy to understand although the images are displayed in many hierarchic levels. When the monitor screen is browsed in a map layout, the screen image can be displayed for each monitoring object. However, when the images are collected according to each control group, the user can visually and easily understand the displayed items.

The monitoring item acquiring part 11 obtains the execution start schedule date and time 23 and the execution result time 32 from the received table change notification. Using a total value of the execution result time 32 and the execution result time 32 notified by each event of the job in the past, the part 11 makes the execution result value calculating part 12 calculate a mean value of the execution result time 32 to resultantly obtain an execution time optimal value.

The monitoring item acquiring part 11 stores the execution start schedule date and time 23 in the execution monitoring start date and time 53. The part 11 adds the execution time optimal value to the execution time optimal value to obtain a predicted end date and time value and sets the obtained value to the execution monitoring end date and time 54. In the operation, it is also possible that the part 11 subtracts a predetermined period of time from the execution start schedule date and time 23 to obtain a value and stores the value in the execution monitoring start date and time 53. The part 11 adds a predetermined period of time to the predicted end date and time to obtain a value and sets the value to the execution monitoring end date and time 54.

As above, by setting the execution monitoring start date and time 53 to a point of time before the execution start schedule date and time 23, information can be collected from the point monitoring section 4 before the execution of the job is started to confirm presence or absence of an abnormal event in a resource such as the central processing unit. By setting the execution monitoring end date and time 54 to a point of time after the predicted end date and time, the monitoring can be continuously carried out even if the execution of the job exceeds the predicted end date and time.

On the other hand, the browsing date and time setting part 17 of the integrated monitor screen browsing section 3 receives specification items of the browsing start date and time indicating a point of time to start browsing monitored statuses and the browsing end date and time indicating a point of time to finish browsing monitored statuses from the browsing operator. The part 17 then sends to the integrated monitoring section 2 the browsing start date and time, the browsing end date and time, and a browsing place to browse monitored statuses, i.e., information indicating a country and an area in which the integrated monitor screen browsing section 3 is installed.

When the user inputs, for example, "May 15th, 9:00 to 17:00" for the browsing start date and time and the browsing end date and time, the monitor screen display part 18 displays only application jobs which are executed or which are being executed during a period of time from 9:00 to 17:00 on May 15th. To browse the present or current statuses, the user specifies at least the present time as the browsing start date and time. When the specified date and time item indicates a point of time in the past, the display part 18 displays monitored statuses of application jobs executed in the past. When the specified date and time item indicates a point of time in the future, the display part 18 displays application jobs to be executed in future and information of failure influencing the application jobs. It is assumed in the embodiment that if the browsing start date and time and the browsing end date and time are not specified, the display part 18 executes processing to browse a job status monitoring screen for all jobs.

When the information is received from the browsing date and time setting part 17, the integrated monitoring section 2 makes the browsing date and time correcting part 14 execute processing to correct information of the date and time according to the time difference between the browsing place or location to browse monitored statuses and the execution place to execute the job.

Figure 6:
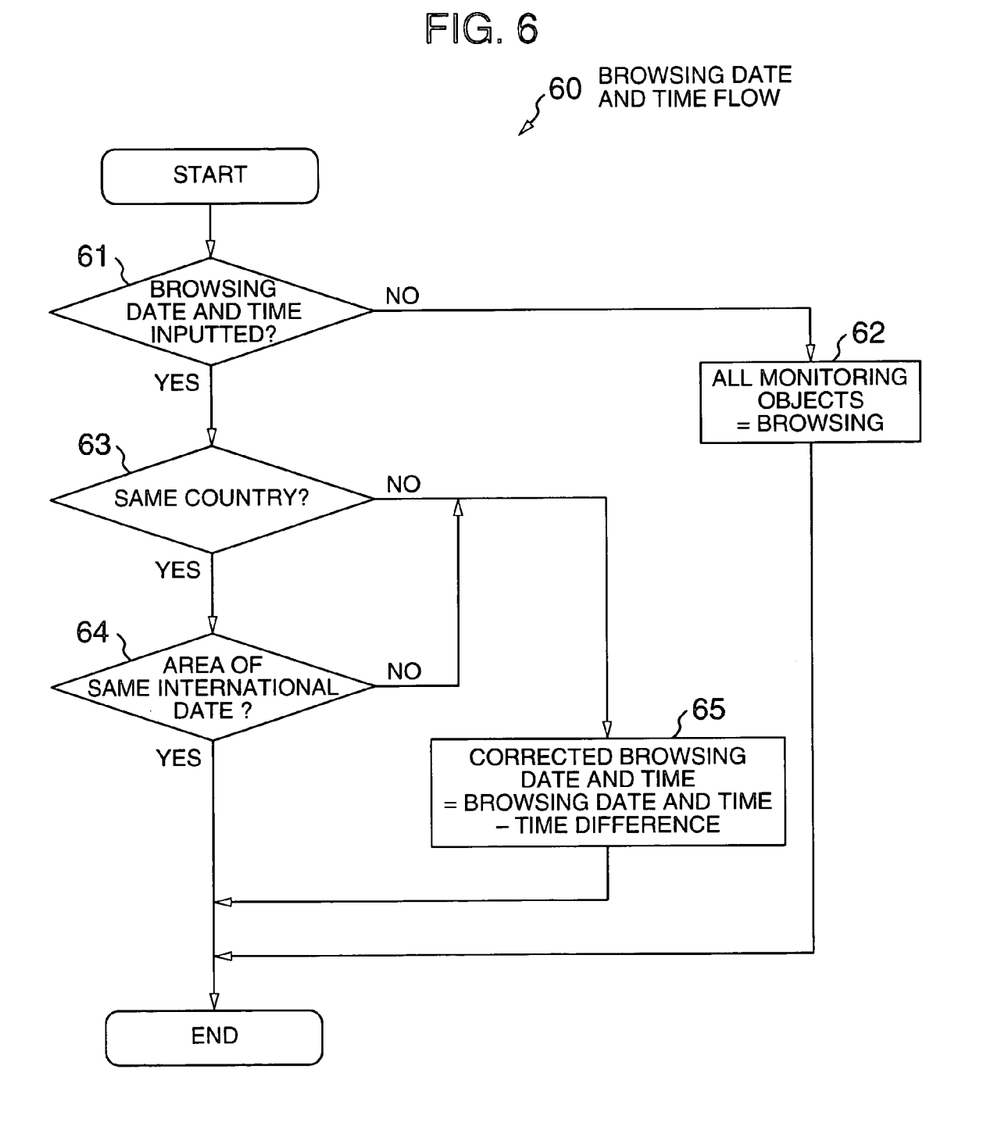
FIG. 6 is a flowchart showing a processing procedure to correct a browsing date and time item in the embodiment.

FIG. 6 shows in a flowchart a processing procedure to correct the browsing date and time information in the embodiment. The flowchart shows a flow of processing for the browsing date and time correcting part 14 to correct the browsing date and time. The browsing operator inputs a period of browsing time using the browsing date and time setting part 17.

In step 61, the browsing date and time correcting part 14 refers to the contents of the information received from the integrated monitor screen browsing section 3 and makes a check to determine whether or not the browsing start date and time and the browsing end date and time have already been set. If these items are absent, the part 14 registers all monitoring objects as browsing objects in step 62. If these items are present, control goes to step 63.

In step 63, the browsing date and time correcting part 14 refers to the contents of the information received from the integrated monitor screen browsing section 3 to obtain the browsing place and compares the browsing place with the contents of the execution place 24 in the schedule table 20 to determine whether or not the country of the browsing place is substantially equal to that of the execution place 24. If the countries are equal to each other, control goes to step 64; otherwise, control goes to step 65.

In step 64, the browsing date and time correcting part 14 compares the browsing place from the section 3 with the contents of the execution place 24 in the schedule table 20 to determine whether or not the area of the same international date of the browsing place is substantially equal to that of the execution place 24. If the areas are equal to each other, the part 14 terminates the processing; otherwise, control goes to step 65.

In step 65, using the time difference between the time of the country and area of the browsing place and Greenwich Time and the time difference between the time of the country and area of the execution place and Greenwich Time, the browsing date and time correcting part 14 calculates the time difference between the browsing place and the execution place. The part 14 subtracts the time difference from the browsing start date and time and the browsing end date and time to obtain the corrected values of these items. The part 14 then stores these corrected values in the memory with a correspondence established between these values and the job name 21 of the execution place.

The browse screen display time adjusting part 13 of the integrated monitoring section 2 makes a check to determine whether or not a browsing time zone between the browsing start date and time and the browsing end date and time overlaps with a monitoring time zone between the execution monitoring start date and time 53 and execution monitoring end date and time 54 to execute processing to select a job as a browsing object.

Figure 7:
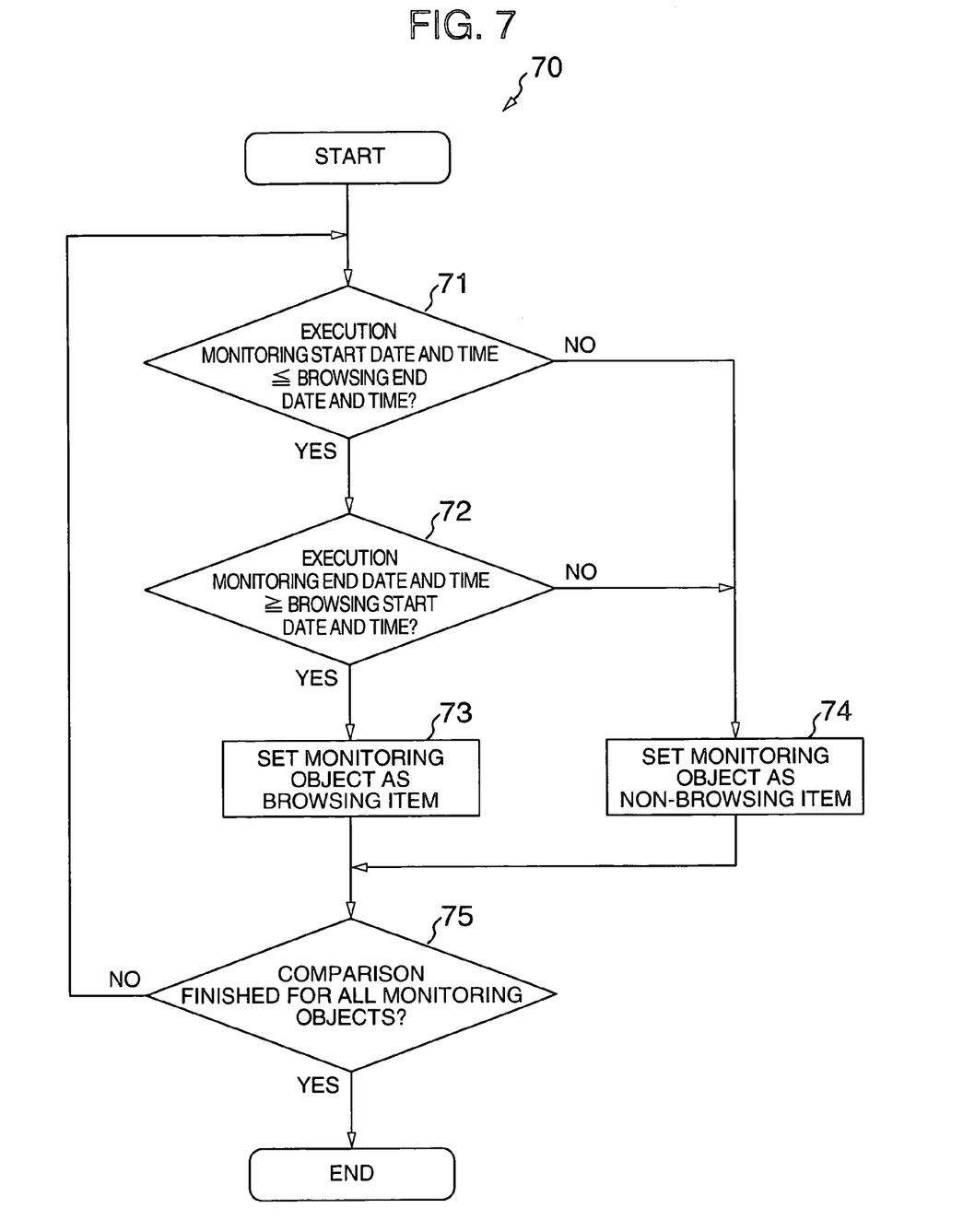
FIG. 7 is a flowchart showing a processing procedure of browsing object selection in the embodiment.

FIG. 7 shows a processing procedure of the processing to select a browsing object in the embodiment in a flowchart. In step 71, the browse screen display time adjusting part 13 refers to the browse screen display time adjusting table 50 and compares the execution monitoring start date and time 53 with the browsing end date and time received from the integrated monitor screen browsing section 3. If the value of the execution monitoring start date and time 53 is less than or equal to that of the browsing end date and time, control goes to step 72. Otherwise, control goes to step 74. It is assumed that when the corrected browsing end date and time corresponding to the job name 21 associated with the monitoring object 52 is already stored in the memory, the corrected browsing end date and time is used.

In step 72, the adjusting part 13 refers to the time adjusting table 50 to compare the execution monitoring end date and time 54 with the browsing start date and time received from the integrated monitor screen browsing section 3. If the value of the execution monitoring end date and time 54 is more than or equal to that of the browsing start date and time, control goes to step 73. Otherwise, control goes to step 74. It is assumed that when the corrected browsing start date and time corresponding to the job name 21 associated with the monitoring object 52 is present in the memory, the corrected browsing start date and time is used.

In step 73, the browse screen display time adjusting part 13 selects the monitoring object as a browsing item and stores the job name of the monitoring object 52 in the memory. In step 74, the part 13 sets the monitoring object 52 as the non-browsing item and makes a check to determine whether or not the job name of the monitoring object 52 is present in the memory. If the job name is present therein, the part 13 deletes the job name from the memory.

In step 75, the part 13 makes a check to determine whether or not the date and time comparison has already been conducted for all monitoring objects. If the comparison has not been finished for all monitoring objects, control returns to step 71 to continue the processing. If the comparison has been finished for all monitoring objects, the processing is terminated.

When the browsing item is selected as above, the integrated monitor screen data generating part 16 obtains from the memory a job name of the job selected as the browsing item by the browse screen display time adjusting part 13. The part 16 then obtains from the data saving section 10 the monitored status 55 of the monitoring object 52 corresponding to the job and other information regarding the job to create monitor screen data to display the status of the job. The part 16 then sends the data to the integrated monitor screen browsing section 3.

In the section 3, the monitor screen display part 18 receives the monitor screen data generated by the integrated monitor screen data generating part 16 from the integrated monitoring section 2 and executes processing to display a monitor screen on a display of the integrated monitor screen browsing section 3 to monitor job statuses.

After the integrated monitor screen data generating part 16 creates the monitor screen data, when the event receiving part 15 receives an event having a high priority level such as a change of the state 43 or a result of termination of a job, the data generating part 16 creates monitor screen data according to the contents of the event. The part 16 sends the data to the integrated monitor screen browsing section 3. As a result, the monitor screen is appropriately updated to its latest state in the processing.

When a job once displayed as above is normally terminated, the job is deleted from the screen image. However, when the job is abnormally terminated, the job is kept displayed as a browsing item in the screen image even after the execution monitoring end date and time.

In the processing, a mean value of the values of the execution result time 32 resultant from execution of the job is used as the execution result time to set the execution start date and time 53 and the execution end date and time 54. However, it is also possible that using a relationship between the execution result time 32 and the rate of operation at the execution of the job, the system calculates the execution time optimal value indicating the period of time to execute the job at the rate of operation and stores the optimal value in the data saving table of the data saving section 10. The execution start date and time 53 and the execution end date and time 54 are set using the execution time optimal value as the execution time.

Figure 8:
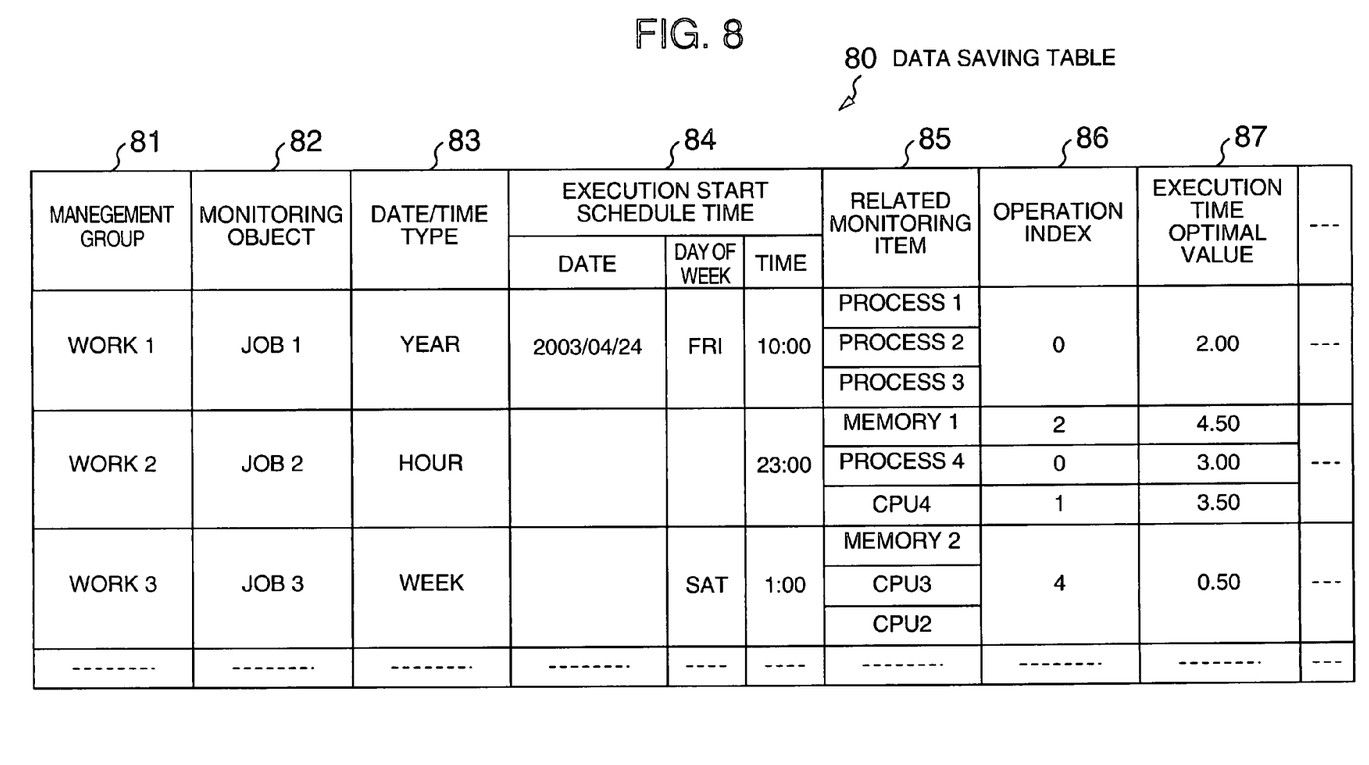
FIG. 8 is a diagram showing an example of data items in a data saving table of the embodiment.

FIG. 8 shows an example of data items in the data saving table of the embodiment. As can be seen from FIG. 8, the data saving table 80 includes a control group 81 indicating a name to collectively control the monitoring item, a monitoring object 82 indicating a job to be monitored, a date and time type 83 storing a schedule type to discriminate the work types such as a weekly work to be executed once a week, a daily work to be daily executed, and a work to be executed on a particular day specified in advance, an execution start schedule date and time field 84 to store a date and time item to start execution of the job, a related monitoring item 85 indicating resources which are selected from the resources being monitored by the point monitoring section 4 and which influence execution of the job, an operation index 86 classifying the rate of operation in several levels, and an execution time optimal value 87 indicating a period of execution time calculated in consideration of the rate of operation.

Figure 9:
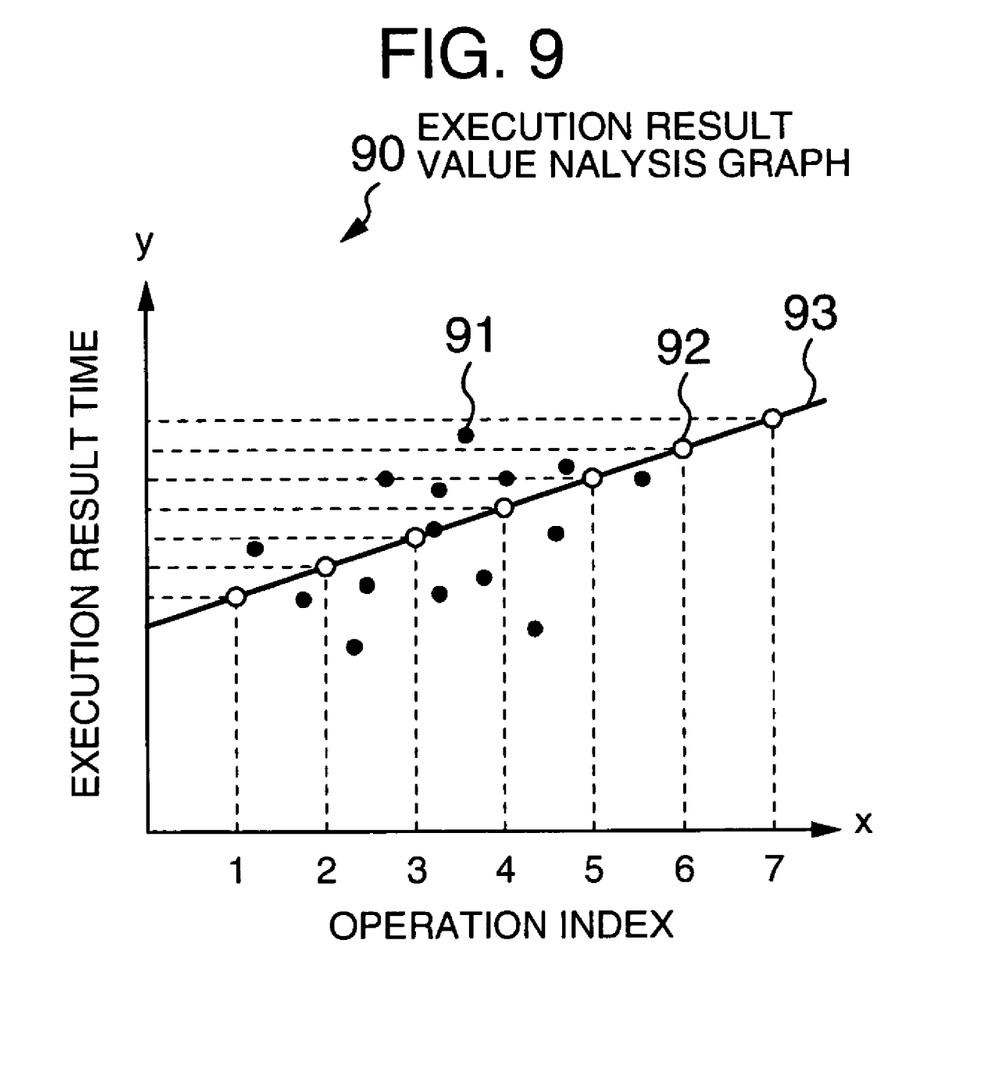
FIG. 9 is a diagram showing an example of a graph obtained by analyzing execution result values in the embodiment.

FIG. 9 is a graph showing an example of analysis results obtained by analyzing execution result values of the embodiment. When a plurality of jobs are executed and the rate of operation of a resource becomes greater for a job, the operation index also increases. It is considered in this situation that the execution result time of the job becomes longer as shown in FIG. 9. According to the method of least squares, a straight line is used as an approximation of the relationship between the operation index and the execution result time to calculate the execution time optimal value for each operation index.

The monitoring item acquiring part 11 makes a search through the monitoring item table 40 using the related item 25 of the schedule table 20 as a search key to retrieve the monitoring item 41. In the table 20, the name of the host to execute the job is used as a key to establish a correspondence between the related item 25 and the monitoring item 41. However, any key may be used only if the correspondence can be uniquely established. After establishing the correspondence between the related item 25 and the monitoring item 41, the acquiring part 11 obtains the rate of operation 45 from the associated record and stores the ratio 45 as the operation index 86 in the data saving table 80. The value of the rate of operation 45 varies depending on time zones in many cases. Therefore, at an interval of predetermined period of time or when the operating ratio 45 is varied, the acquiring part 11 obtains the rate of operation 45 and stores the rate 45 in the data saving table 80. When the point monitoring section 4 is absent, namely, when the point monitoring is not conducted for the monitoring item 41 corresponding to the related item 25 and hence the monitored status is not known, the operation index is set to "0" in the data saving table 80.

After the monitoring item acquiring part 11 completely establishes the correspondence between all related items 25 and the monitoring item 41, the execution result value calculating part 12 calculates the execution time optimal value 87 using the operation index 86.

Figure 10:
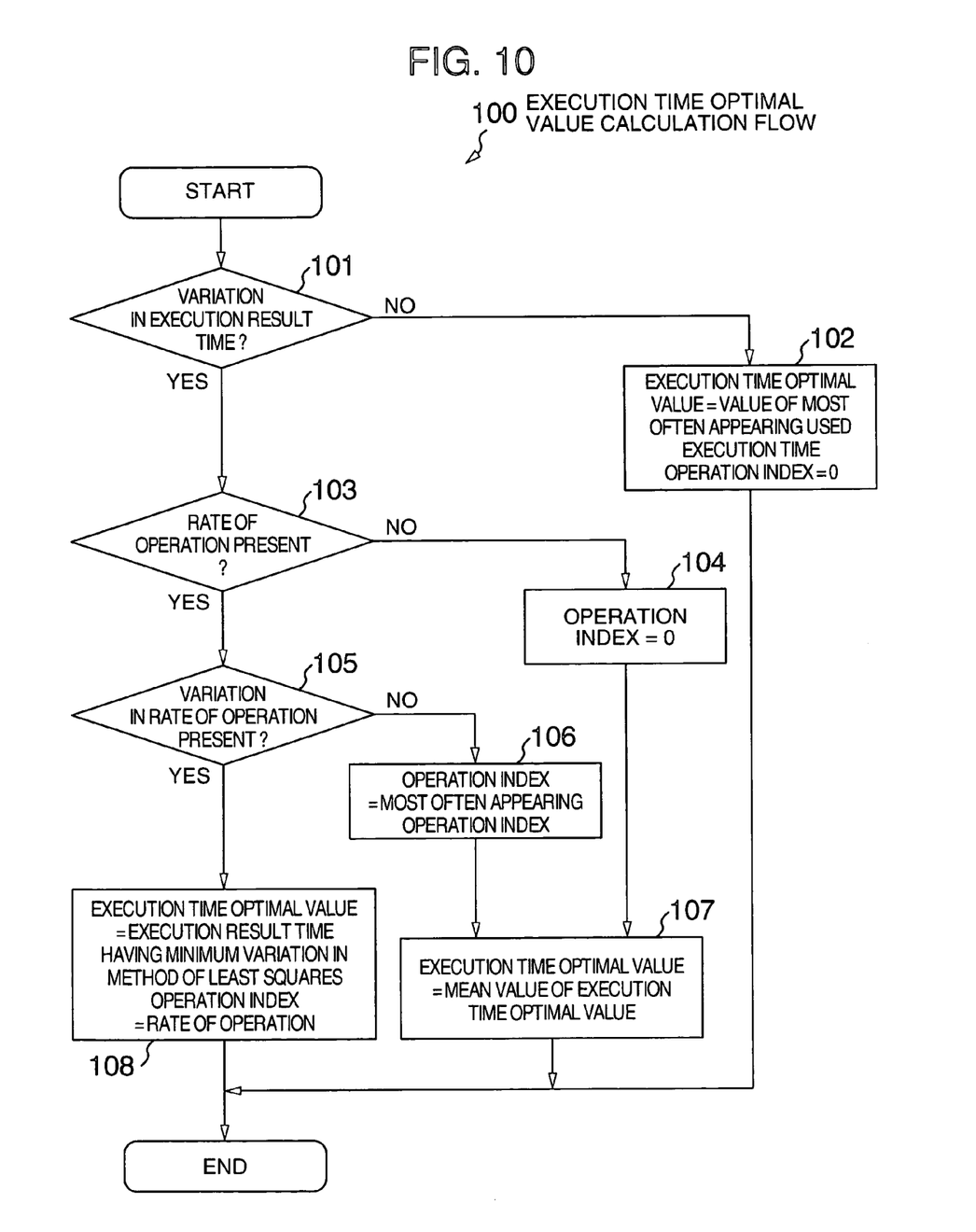
FIG. 10 is a flowchart showing a procedure of processing to calculate an execution time optimal value in the embodiment.

FIG. 10 shows in a flowchart a procedure of processing to calculate an execution time optimal value in the embodiment. In step 101, the calculating part 12 makes a check to determine whether or not any variation is present in the execution result time 32. The calculating part 12 calculates the difference between the minimum execution result time and the maximum execution result time and determines whether or not the time difference is within 0.01% of the overall execution result time. If the execution result time difference is within this range, the calculating part 12 assumes that no variation is present in the execution result time 32 and goes to step 102. The calculating part 12 selects one value from the most frequently appearing values of the execution result time and sets the value to the execution time optimal value 87. In this situation, the operation index 86 is set to "0" and is not taken into consideration.

When no variation is present in the execution result time 32, the calculating part 12 goes to step 103 to refer to the rate of operation. When the point monitoring is not conducted, the rate of operation 45 has not any data. Therefore, the calculating part 12 goes to step 104 to set "0" to the operation index 86 and goes to step 107. The calculating part 12 adds the values of execution result time 32 to each other to obtain a total value and divides the total value by the number of the measured values to obtain a mean value. The calculating part 12 then sets the mean value to the execution time optimal value 87.

If the variation is not found in the rate of operation 45 in step 105 even when the point monitoring is conducted, the calculating part 12 goes to step 106 to obtain the operation index 86 according to the levels of the rate of operation. In step 107, the calculating part 12 adds the values of execution result time 32 to each other to obtain a total value and divides the total value by the number of measured values to obtain a mean value. The calculating part 12 sets the mean value to the execution time optimal value 87.

When the variation is found in the rate of operation 45 in step 105, it is assumed that load varies between resources in the execution of the job. Therefore, the calculating part 12 goes to step 108. Assuming that the execution result time is y and the operation index is x, the calculating part 12 obtains the execution time optimal value using the method of least squares in which the residual sum of squares of the execution result time and the operation index takes a minimum value.

Assume that the execution result time y is represented by expression 1 and the number of the measured values of the execution result time is n. The execution time optimal value is determined by obtaining values of a and b satisfying expression 2.

$$y = a + bx \qquad (1)$$

$$\sum_{i=1}^{n} \{y_i - (a + bx_i)\}^2 = 0 \qquad (2)$$

After the values of a and b are obtained, the execution result value calculating part 12 calculates the execution time optimal value 87 corresponding to the operation index 86 at one of the levels (seven levels in FIG. 9) using expression 1.

When the calculating part 12 calculates the execution time optimal value 87, the monitoring item acquiring part 11 determines the execution monitoring start date and time 53 and the execution monitoring end date and time 54 using, for example, expression 3.

Execution monitoring start date and time=Execution start schedule date and time−Operation index×c−Abnormal termination count×d Execution monitoring end date and time=Execution start schedule date and time+Execution time optimal value+Operation index×f+Abnormal termination count×g      (3)

In expression 3, time coefficients c, d, f, and g are arbitrary periods of time.

In the embodiment, thanks to provision of indices influencing applications or jobs such as a value of the operation index indicating an rate of operation of a resource and the abnormal termination count indicating the number of abnormal terminations, the monitoring time can be elongated to filter the browsing item by the browsing date and time according to the application schedule in consideration of the execution result time. The manager can set the time coefficients at a desired point of time. Therefore, when it is desired to filter the browsing item only by the execution schedule time without any marginal width, the manager sets "0" to all time coefficients.

To monitor any abnormal termination of a job, the manager sets, for example, an execution monitoring end date and time item to provide width after the termination of the job execution. To monitor occurrence of failure before the execution start schedule start date and time of a job, the manager sets, for example, the execution monitoring start date and time to an earlier point of time.

Figure 11:
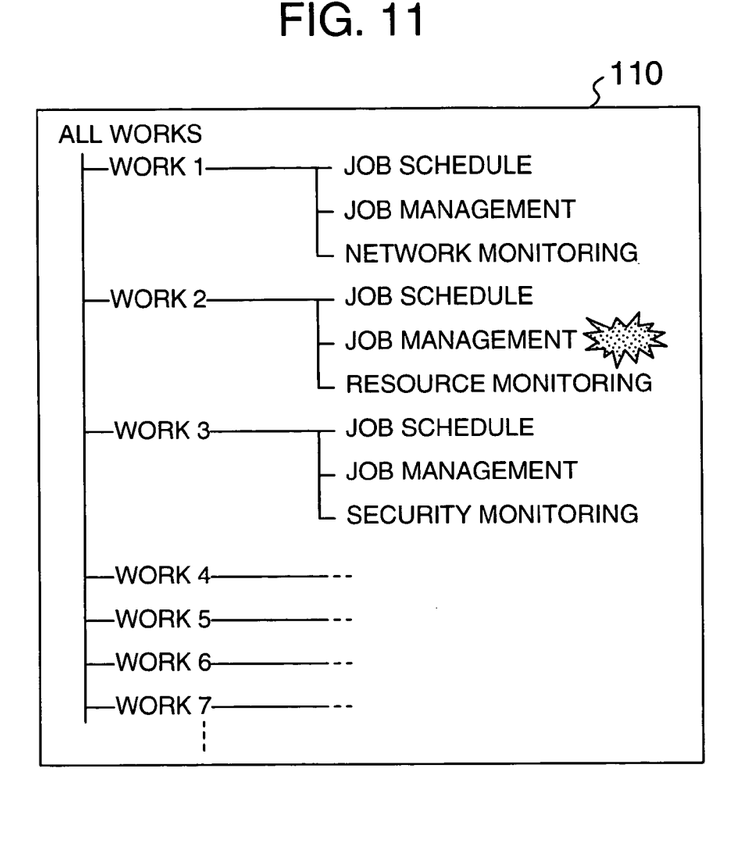
FIG. 11 is a diagram showing a display example in tree structure on a job monitor screen in the embodiment by the current technique.

FIG. 11 shows a tree-structure display example on a job status monitoring screen in the embodiment by the current technique or not using this invention. In FIG. 11, when the browsing date and time setting part 17 of the embodiment does not set the browsing start date and time and the browsing end date and time, the job status monitoring screen is displayed in tree structure according to a request from the user. Monitoring items are displayed in hierarchic structure for work groups such as work group 1, work 2, . . . for each operation site or location. In the example, a fault has occurred in the work 2 and the pertinent monitoring item is blinking or is indicated in, for example, red.

In FIGS. 11 to 14, a fault occurs at a point indicated by a star and the pertinent monitoring item is blinking or indicated in red. However, the item is not necessarily blinking. Any indication, for example, a symbol or a color may be used only if such an indication is easily recognized by the user.

Figure 12:
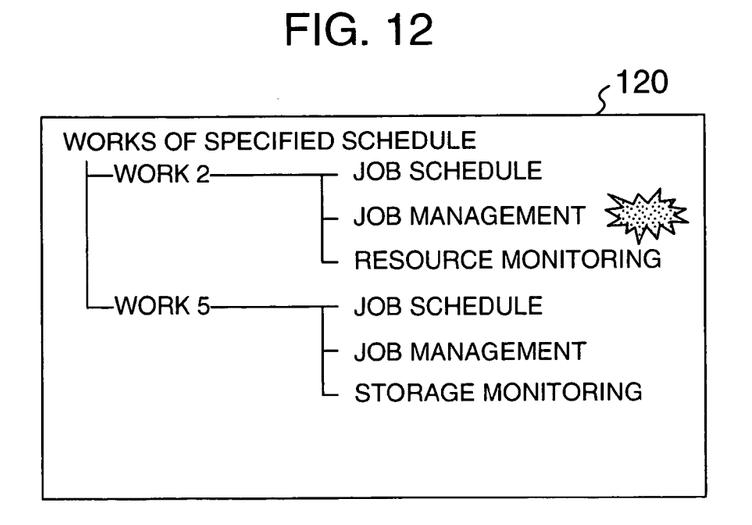
FIG. 12 is a diagram showing a display example in tree structure on a job monitoring screen in the embodiment by this invention.

FIG. 12 shows a tree-structure display example on the job status monitoring screen in the embodiment by using this invention. In the example of FIG. 12, when the browsing date and time setting part 17 of the embodiment sets the browsing start date and time and the browsing end date and time, the monitor screen display part 18 displays the job status monitoring screen in tree structure in association with the work schedule according to a request from the user. Only the works 2 and 5 scheduled to be executed in a browsing time zone set by the browsing date and time setting part 17 are displayed. Only the work 2 in which a fault has occurred is blinking or is indicated in red.

Figure 13:
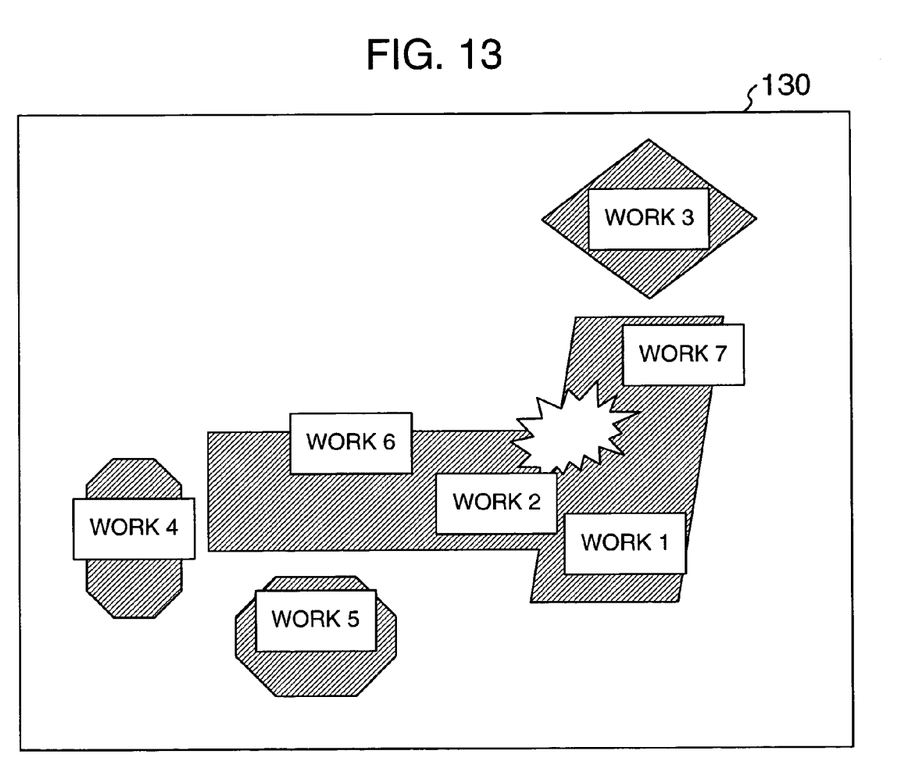
FIG. 13 is a diagram showing an example of a display image in a map layout on a job monitoring screen of the embodiment by the current technique.

FIG. 13 shows an example of a display image displayed in a map layout on a job status monitoring screen by the current technique or not using this invention. In FIG. 13, when the browsing date and time setting part 17 of the embodiment does not set the browsing start date and time and the browsing end date and time, the monitor screen display part 18 displays the job status monitoring screen in a map layout. Monitoring items are displayed in a map layout for work groups such as work group 1, work 2, . . . for each operation site. In the example, a fault has occurred in the application 2 and the pertinent monitoring item is blinking or is indicated in, for example, red.

Figure 14:
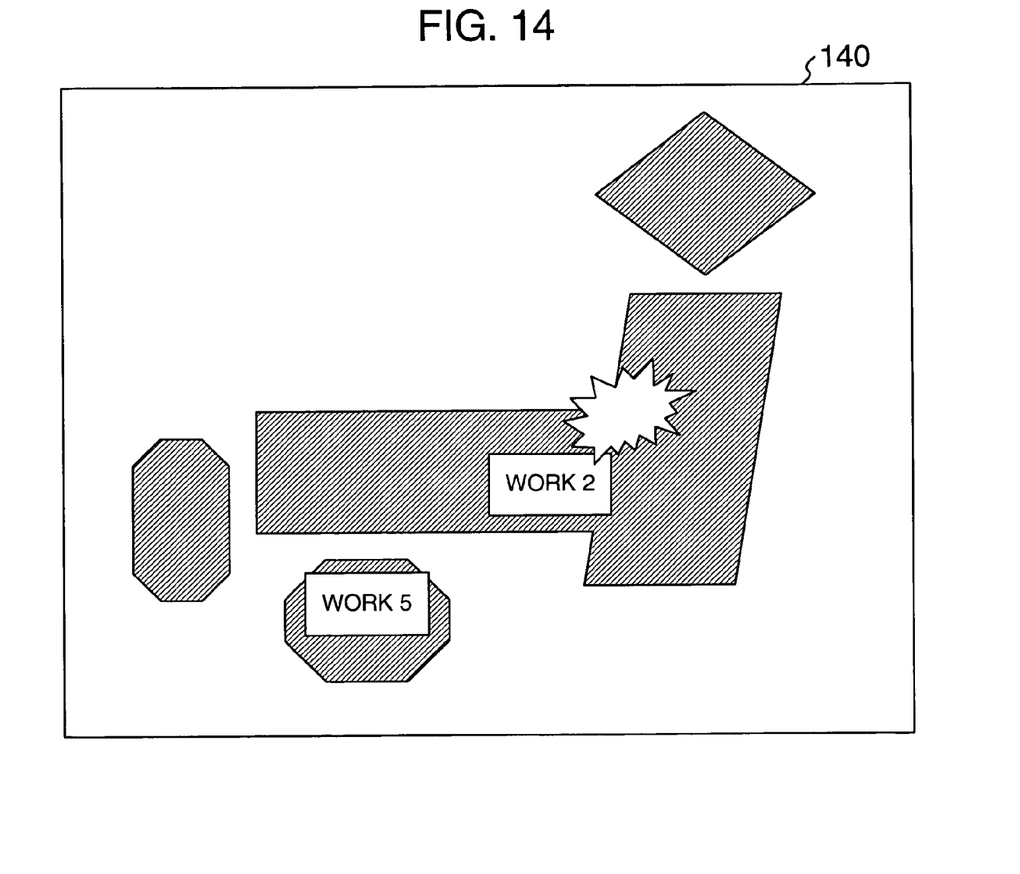
FIG. 14 is a diagram showing an example of a display image in a map layout on a job monitoring screen of the embodiment by this invention.

FIG. 14 shows a display example displaying items in a map layout on the job status monitoring screen of the embodiment by using this invention. In the example of FIG. 14, when the browsing date and time setting part 17 sets the browsing start date and time and the browsing end date and time, the monitor screen display part 18 displays the job status monitoring screen in a map layout according to the work schedule. Only the works 2 and 5 scheduled to be executed in a browsing time zone set by the browsing date and time setting part 17 are displayed. Only the work 2 in which a fault has occurred is blinking or is indicated in red.

In the embodiment, only the information items of works requested by the operator to browse the job status monitoring screen are displayed. Therefore, the job statuses can be efficiently monitored regardless of the browsing place to browse the statuses, experiences of the browsing person, and the numbers respectively of applications and faults.

According to the embodiment of the job status monitoring system described above, the system selects jobs scheduled to be executed in a time zone to browse job statuses and displays the statuses of the jobs. Therefore, the statuses of the jobs executed on a computer can be efficiently monitored at a high speed. The system can also efficiently deal with faults in the jobs at a high speed.

According to the present invention, jobs scheduled to be executed in a time zone to browse job statuses are selected and the statuses of the jobs are displayed. Consequently, it is possible to efficiently monitor at a high speed the statuses of jobs executed on a computer. It is also possible to efficiently deal with faults in the jobs at a high speed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A job status monitoring method of monitoring statuses of jobs executed on a computer, comprising the steps of:
   acquiring schedule information indicating a schedule of execution of a job and pre-setting an item of execution monitoring start date and time indicating a date and time to start monitoring the job and an item of execution monitoring end date and time indicating a date and time to finish monitoring the job;
   selecting, when a pre-set browsing time zone represented by an item of a pre-set browsing start date and time indicating a day and a point of time to start browsing a monitored status and an item of a pre-set browsing end date and time indicating a date and time to finish browsing a monitored status overlaps with a pre-set monitoring time zone represented by the execution monitoring start date and time and the execution monitoring end date and time, a job to which the execution monitoring start date and time and the execution monitoring end date and time are specified and setting the job as a monitoring item to be monitored; and
   creating monitor screen data to display a monitored status of the job selected as the browsing item.

2. A job status monitoring method according to claim 1, comprising the step of pre-setting the execution monitoring start date and time item and the execution monitoring end date and time item, using the execution start schedule date and time item of a job and a execution result time obtained from a result of execution of the job.

3. A job status monitoring method according to claim 2, comprising the step of pre-setting the execution monitoring start date and time item and the execution monitoring end date and time item, by adding a predetermined period of time before and after a time zone between the execution start schedule date and time of the job and a point of time obtained by adding a execution result time of the job to the execution start schedule date and time.

4. A job status monitoring method according to claim 3, comprising the step of pre-setting the predetermined period of time using an rate of operation of a computer executing the job and a number of abnormal terminations of the job.

5. A job status monitoring method according to claim 4, comprising the step of obtaining a mean value of values of execution result time obtained as results of execution of the job.

6. A job status monitoring method according to claim 4, comprising the step of calculating, using a relationship between the execution result time obtained as results of execution of the job and the rate of operation of a computer executing the job, an execution time optimal value indicating a period of time required to execute the job at the rate of operation.

7. A job status monitoring method according to claim 6, comprising the steps of:
   correcting information of the date and time using a time difference between a browsing location at which the monitored status is browsed and an execution location at which the job is executed; and
   selecting a browsing item using the information corrected in the preceding step.

8. A job status monitoring method according to claim 7, comprising the step of displaying, when an event indicating an abnormal termination of the job is received, the monitored status of the job also after a point of time indicated by the execution monitoring end date and time of the job.

9. A job status monitoring system stored in a memory running on a computer for monitoring statuses of jobs executed on a computer, comprising:

- a monitoring item acquiring unit which acquires schedule information indicating a schedule of execution of a job and pre-setting an item of execution monitoring start date and time indicating a date and time to start monitoring the job and an item of execution monitoring end date and time indicating a date and to finish monitoring the job;
- a browse screen display time adjusting unit which selects, when a browsing time zone represented by an item of a pre-set browsing start date and time indicating a date and time to start browsing a monitored status and an item of a pre-set browsing end date and time indicating a date and time to finish browsing a monitored status, overlaps with a pre-set monitoring time zone represented by the execution monitoring start date and time and the execution monitoring end date and time, a job to which the execution monitoring start date and time and the execution monitoring end date and time are specified and setting the job as a monitoring item to be monitored; and
- a integrated monitor screen data generating unit which generates monitor screen data to display a monitored status of the job selected as the browsing item.

10. A computer-readable medium storing a program for making a computer serve as a job status monitoring system which monitors statuses of jobs executed on a computer, comprising:

- a program part which, when executed by the computer, makes the computer serve as a monitoring item acquiring unit which acquires schedule information indicating a schedule of execution of a job and pre-setting an item of execution monitoring start date and time indicating a date of time to start monitoring the job and an item of execution monitoring end date and time indicating a date and time to finish monitoring the job;
- a program part which, when executed by the computer, makes the computer serve as a browse screen display time adjusting unit which selects, when a pre-set browsing time zone represented by an item of a pre-set browsing start date and time indicating a date and time to start browsing a monitored status and an item of a pre-set browsing end date and time indicating a date and time to finish browsing a monitored status, overlaps with a preset monitoring time zone represented by the execution monitoring start date and time and the execution monitoring end date and time, a job to which the execution monitoring start date and time and the execution monitoring end date and time are specified and setting the job as a monitoring item to be monitored; and
- a program part which, when executed by the computer, makes the computer serve as a integrated monitor screen data generating unit for generating a monitor screen data to display a monitored status of the job selected as the browsing item.

* * * * *